(12) United States Patent
Hoover et al.

(10) Patent No.: US 7,300,118 B2
(45) Date of Patent: Nov. 27, 2007

(54) ELECTRONIC PARK BRAKE VALVE SYSTEM FOR AIR BRAKES VEHICLES

(75) Inventors: Joe Hoover, Kansas City, MO (US); Robert Rudolph, Kansas City, MO (US); David G. Engelbert, Kansas City, MO (US); Noble Hamilton, Nampa, ID (US)

(73) Assignee: Haldex Brake Corporation, Kansas City, MO (US)

( * ) Notice: Subject to any disclaimer, the term of this patent is extended or adjusted under 35 U.S.C. 154(b) by 266 days.

(21) Appl. No.: 11/153,142

(22) Filed: Jun. 15, 2005

(65) Prior Publication Data

US 2006/0284479 A1    Dec. 21, 2006

(51) Int. Cl.
*B60T 13/74* (2006.01)
(52) U.S. Cl. ............................................ 303/3; 303/15
(58) Field of Classification Search .................... 303/3, 303/7, 15; 91/418, 428, 453, 459
See application file for complete search history.

(56) References Cited

U.S. PATENT DOCUMENTS

| | | | | |
|---|---|---|---|---|
| 3,826,283 A | * | 7/1974 | Klimek | 303/56 |
| 4,050,746 A | * | 9/1977 | Durling | 303/40 |
| 5,061,015 A | * | 10/1991 | Cramer et al. | 303/7 |
| 5,443,306 A | * | 8/1995 | Broome | 303/3 |
| 6,322,159 B1 | | 11/2001 | Eberling | 303/7 |
| 6,322,161 B1 | | 11/2001 | Maslonka et al. | 303/89 |
| 6,450,587 B1 | | 9/2002 | MacGregor et al. | 303/89 |
| 6,450,870 B2 | | 9/2002 | Ito | 303/9 |
| 6,685,281 B2 | | 2/2004 | MacGregor et al. | 303/123 |
| 6,752,472 B2 | | 6/2004 | Bezzina | 303/7 |
| 2003/0038533 A1 | | 2/2003 | Bezzina | 303/3 |
| 2003/0075973 A1 | | 4/2003 | Soupal | 303/113.1 |
| 2004/0124697 A1 | | 7/2004 | MacGregor et al. | 303/89 |
| 2004/0187674 A1 | | 9/2004 | Bennett et al. | 91/418 |

FOREIGN PATENT DOCUMENTS

WO       WO 02/24504 A1    9/2001

OTHER PUBLICATIONS

European Search Report, Oct. 5, 2006, 6 pages.

* cited by examiner

*Primary Examiner*—Thomas Williams
(74) *Attorney, Agent, or Firm*—St. Onge Steward Johnston & Reens LLC

(57) ABSTRACT

A vehicle brake system includes a source of fluid pressure adapted to supply a braking force a brake actuator including a parking brake chamber, and a combination valve fluidly coupling the brake actuator to the source of pressure, the combination valve having an inlet fluidly coupled to the source of pressure and an outlet fluidly coupled to the brake actuator. The combination valve includes within a single housing (i) a solenoid responsive to electrical signals to move from one position in which the parking brake chamber is fluidly coupled to the source of pressure in order to pressurize the parking brake chamber and release the parking brake, and another position in which the parking brake chamber of the brake actuator is vented in order to exhaust pressure within the parking brake chamber so that the parking brake is applied, and (ii) at least one of a manifold, an inversion valve, a double check valve and an anti-compounding valve.

14 Claims, 3 Drawing Sheets

ELECTRONIC PARK BRAKE VALVE SYSTEM FOR AIR BRAKES VEHICLES

FIELD OF THE INVENTION

The present invention relates to pneumatic brake systems such as those employed in heavy vehicles, and more specifically to control valves used in such systems, particularly those used in parking brake systems.

BACKGROUND OF THE INVENTION

The majority of current heavy vehicle brake systems use compressed air to apply the brakes. In such systems, control signals are typically transmitted from the driver of the vehicle to the control valves of the brake system, and the brakes are applied. These types of brakes are generally divided into two categories: service brakes and parking brakes. Service brakes are used primarily to slow the vehicle to a stop when the vehicle is moving. Parking brakes are used primarily for helping to prevent the vehicle from moving from a parked position, and may also be used in an emergency situation to slow a moving vehicle when the service brakes have failed, in order to provide a redundant brake circuit.

For service brakes, an operator generally depresses a brake pedal, which in turn actuates a control valve, allowing air pressure to travel to the brake, and the brake is applied. The parking brake is generally engaged by a vehicle operator by actuating a push/pull hand lever within the cab of the vehicle, located on the vehicle dash. The parking brake is generally a spring brake which is normally engaged, meaning that air pressure must be applied to the parking brake in order to release it. parking brake is generally a spring brake which is normally engaged, meaning that air pressure must be applied to the parking brake in order to release it. Thus, when there is no air pressure present, the parking brake is applied. Accordingly, if a vehicle loses air pressure (i.e., ruptured hose, failed component, etc.), and thus loses service brake air pressure and the ability to apply the service brakes, the parking brake will automatically engage, and act to slow a moving vehicle. Likewise, when the vehicle is parked and/or not in use, the parking brake can be engaged by the operator, helping to prevent the vehicle from moving from a parked position.

As mentioned above, typical current day heavy vehicles have a push/pull knob located in the cab of the vehicle which is used to engage and disengage the parking brake. A vehicle may have more than one push/pull knob, depending upon whether there is an additional control for the parking brakes on a trailer attached to the vehicle. The push/pull knob is generally connected to a push/pull double check (PPDC) valve, which controls the flow of air to the parking brake. Generally, when an operator pushes the valve in, it acts to provide air pressure to the parking brake, and thus release the brake, allowing the vehicle to move. In order to apply the brake, the operator pulls the push/pull knob, thus removing air pressure from the parking brake and causing it to engage. Generally, when the knob is pushed in, the air pressure acts to engage the knob and keep it in the pushed in position. Such push/pull knobs also have a feature which allows a manual override where, even if there is a failure in the air system, or the air pressure is not high enough to engage the push/pull knob, the operator may manually hold the knob in to disengage the parking brake and move the vehicle a short distance.

While this is a relatively simple system, it does have several disadvantages. For example, because air lines are routed to and from the switch in the dash of the vehicle, the dash must be relatively large to accommodate the air hoses. Additionally, it can be difficult to install the valve and associated air hoses because of the tight area in which they go behind the dash. Furthermore, maintenance can be difficult in a case where there is an air leak in the valve or associated hoses. The air leak can be difficult to find and repair due to the restricted area of the dash.

These disadvantages are remedied to some extent in numerous prior art references which disclose the that the in-dash PPDC valve can be replaced by a solenoid disposed away from the dash, which solenoid receives electronic control signals from a push button, switch, or the like which is disposed within reach of the vehicle driver (e.g., on the dash of the vehicle). Examples of references which disclose this feature include U.S. Pat. Nos. 6,752,472, 6,322,159, 6,450,587, 6,322,161 and 6,685,281, U.S. Patent Application Publication No. US 2004/0124697 A1, and PCT International Publication No. WO 02/24504 A1. Employing an electronically controlled solenoid rather than the typical in-dash PPDC valve fairly satisfactorily remedies the above-described disadvantages associated with traditional in-dash PPDC valves, while at the same time allowing for advanced features and control schemes to be implemented, such as those disclosed in U.S. Pat. No. 6,322,161 (described in more detail below). However, the brake systems disclosed in all of these references still suffer from a number of disadvantages.

One of such disadvantages relates to the complexity of such systems. Although not fully described in all of the above references, typical heavy vehicle brake systems do not employ only a PPDC valve, but rather also include several additional components and valves, such as a manifold, an inversion valve, an anti-compounding valve, a relay valve, and possibly others. Such systems often require a significant amount of plumbing running in a complex web to connect the various system components. Not only is this large amount of plumbing expensive, heavy and relatively difficult to install (thereby requiring a relatively large amount of time to install), but the potentially long lengths of plumbing between components can lead to delays in achieving required system pressures, such that, for example, parking brake release timing is increased. Moreover, the valves and system components themselves can be expensive, take up a large amount of space, and significantly add to the vehicle's weight.

What is desired, therefore, is a pneumatic brake system for heavy vehicles which does not require a significant amount of plumbing running in a complex web to connect various system components, which does not require plumbing that is expensive, heavy and relatively difficult to install and which can be installed relatively quickly, which does not suffer from long delays in achieving required system pressures such that parking brake release timing is satisfactory, and which does not employ valves and system components which themselves are expensive, take up a large amount of space, and significantly add to the vehicle's weight.

SUMMARY OF THE INVENTION

Accordingly, it is an object of the present invention to provide a pneumatic brake system for heavy vehicles which does not require a significant amount of plumbing running in a complex web to connect various system components.

Another object of the present invention is to provide a pneumatic brake system for heavy vehicles having the above characteristics and which does not require plumbing that is expensive, heavy and relatively difficult to install and which can be installed relatively quickly.

A further object of the present invention is to provide a pneumatic brake system for heavy vehicles having the above characteristics and which does not suffer from long delays in achieving required system pressures such that parking brake release timing is satisfactory.

Still another object of the present invention is to provide a pneumatic brake system for heavy vehicles having the above characteristics and which does not employ valves and system components which themselves are expensive, take up a large amount of space, and significantly add to the vehicle's weight.

These and other objects are achieved according to one embodiment of the present invention by provision of a vehicle brake system including a parking brake, the brake system including a source of fluid pressure adapted to supply a braking force to at least one brake actuator including a parking brake chamber, and a combination valve fluidly coupling the brake actuator to the source of fluid pressure, the combination valve having an inlet fluidly coupled to the source of fluid pressure and an outlet fluidly coupled to the brake actuator. The combination valve includes within a single housing (i) a solenoid responsive to electrical signals to move from one position in which the parking brake chamber of the brake actuator is fluidly coupled to the source of fluid pressure in order to pressurize the parking brake chamber and release the parking brake, and another position in which the parking brake chamber of the brake actuator is vented in order to exhaust pressure within the parking brake chamber so that the parking brake is applied, and (ii) at least one of a manifold, an inversion valve, a double check valve and an anti-compounding valve.

In some embodiments, the combination valve comprises within a single housing the solenoid and at least two of the manifold, the inversion valve, the double check valve and the anti-compounding valve. In certain of these embodiments, the combination valve comprises within a single housing the solenoid and at least three of the manifold, the inversion valve, the double check valve and the anti-compounding valve. In certain of these embodiments, the combination valve comprises within a single housing the solenoid and all four of the manifold, the inversion valve, the double check valve and the anti-compounding valve. In some embodiments, the brake system further comprises a switch which generates the electrical signals to which the solenoid is responsive. In certain of these embodiments, the switch is located on a dash of the vehicle. In some embodiments, the source of fluid pressure comprises a primary supply reservoir and a secondary reservoir, both of which are fluidly coupled to the combination valve.

In some embodiments, the brake actuator further includes a service brake chamber, and the brake system further comprises a brake pedal operable by a driver of the vehicle in order to supply pressure to the service brake chamber. In certain of these embodiments, the brake pedal is fluidly coupled between the source of fluid pressure and the combination valve. In certain of these embodiments, the source of fluid pressure comprises a primary supply reservoir and a secondary reservoir, both of which are fluidly coupled to the brake pedal. In certain of these embodiments, the primary supply reservoir and the secondary supply reservoir are further fluidly coupled directly to the combination valve. In some embodiments, at least one brake actuator comprises a plurality of brake actuators.

In accordance with another embodiment of the present invention, a combination valve adapted for use in a vehicle brake system including a parking brake has an inlet adapted to be fluidly coupled to a source of fluid pressure and an outlet adapted to be fluidly coupled to a brake actuator having a parking brake chamber, the combination valve comprising within a single housing: a solenoid responsive to electrical signals to move from one position in which the outlet is fluidly coupled to the inlet, and another position in which the outlet is vented; and at least one of a manifold, an inversion valve, a double check valve and an anti-compounding valve.

In some embodiments, the combination valve comprises within a single housing the solenoid and at least two of the manifold, the inversion valve, the double check valve and the anti-compounding valve. In certain of these embodiments, the combination valve comprises within a single housing the solenoid and at least three of the manifold, the inversion valve, the double check valve and the anti-compounding valve. In certain of these embodiments, the combination valve comprises within a single housing the solenoid and all four of the manifold, the inversion valve, the double check valve and the anti-compounding valve. In some embodiments, the electrical signals to which the solenoid is responsive are generated by a switch. In certain of these embodiments, the switch is located on a dash of the vehicle.

In accordance with a further embodiment of the present invention, a vehicle brake system, including a parking brake, comprises: a primary fluid pressure supply reservoir and a secondary fluid pressure supply reservoir adapted to supply a braking force to at least one brake actuator including a parking brake chamber and a service brake chamber; a brake pedal fluidly coupled to the primary fluid pressure supply reservoir and the secondary fluid pressure supply reservoir, the brake pedal operable by a driver of the vehicle in order to supply pressure to the service brake chamber; a combination valve fluidly coupled between the brake pedal and the brake actuator, the combination valve also being fluidly coupled directly to the primary fluid pressure supply reservoir and the secondary fluid pressure supply reservoir. The combination valve comprises within a single housing: a solenoid responsive to electrical signals received from a switch located on a dash of the vehicle to move from one position in which the parking brake chamber of the brake actuator is fluidly coupled to the source of fluid pressure in order to pressurize the parking brake chamber and release the parking brake, and another position in which the parking brake chamber of the brake actuator is vented in order to exhaust pressure within the parking brake chamber so that the parking brake is applied; a manifold; an inversion valve; a double check valve; and an anti-compounding valve.

In some embodiments, the at least one brake actuator comprises a plurality of brake actuators.

The invention and its particular features and advantages will become more apparent from the following detailed description considered with reference to the accompanying drawings.

DETAILED DESCRIPTION OF AN EMBODIMENT OF THE INVENTION

Figure 1:
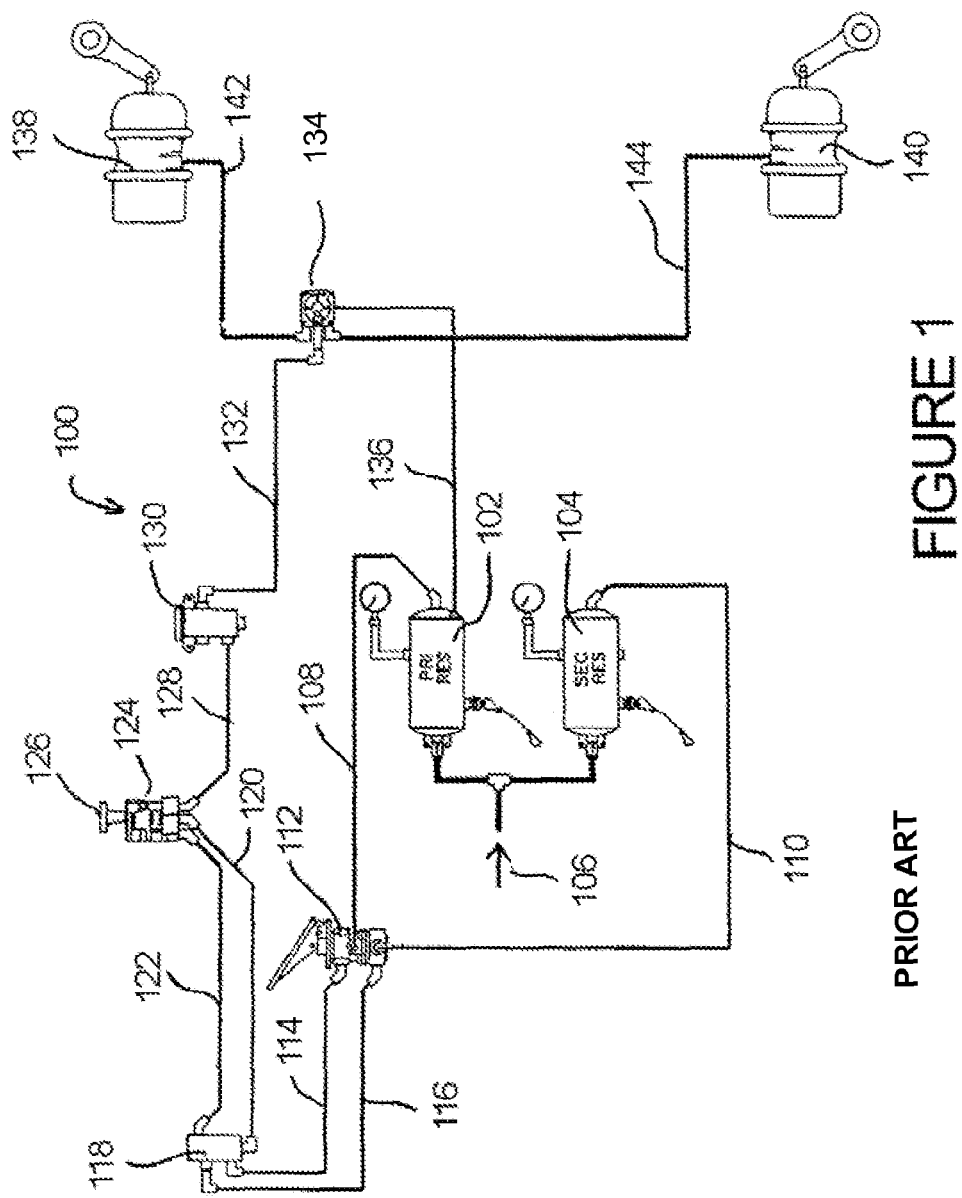
FIG. 1 is a schematic view of a typical prior art pneumatic brake system for heavy vehicles.

Referring first to FIG. 1, a typical prior art pneumatic brake system 100 for heavy vehicles is shown. The system 100 includes a primary pressurized air supply reservoir 102 and a secondary pressurized air supply reservoir 104, both of which receive pressurized air from a pressurized air source (indicated by arrow 106), which typically takes the form of a compressor. Primary and secondary pressurized air supply reservoirs 102,104 are connected via conduits 108, 110 to a brake pedal 112 which is disposed within the cab of the vehicle, typically within easy reach of the foot of the vehicle's driver.

Brake pedal 112 is connected via conduits 114, 116 to a manifold 118, which in turn is connected via conduits 120, 122 to a push/pull double check (PPDC) valve 124, which typically includes a push/pull hand lever 126 within the cab of the vehicle, typically located on the vehicle dash within reach of the driver. PPDC valve 124 is connected, via conduit 128 to an inversion valve 130, which is in turn connected via conduit 132 to a relay valve 134. Relay valve 134 is also connected directly to primary pressurized air supply reservoir 102 via conduit 136. Relay valve 134 is also connected to two brake actuators 138, 140 via conduits 142, 144.

Brake actuators 138, 140 are typical dual chamber actuators which include a service brake chamber and a parking (or emergency) brake chamber. By actuating the brake pedal 112, the driver causes pressurized air to be directed to the service brake chambers of the brake actuators 138, 140 such that the service brakes are applied to slow the vehicle to a stop when the vehicle is moving. By actuating the push/pull hand lever 126 of the push/pull double check (PPDC) valve 124, the driver causes pressurized air to be directed to the parking brake chambers of the brake actuators 138,140 such that the parking brakes (which are usually biased to the applied position) are released and the vehicle is free to move.

Because the configuration and operation of systems of the type shown in FIG. 1 are extremely well known, further details thereof are not provided herein. However, as should be apparent to those skilled in the art, it is worth noting that prior art system 100 includes four separate valve elements (manifold 118, PPDC valve 124, inversion valve 130 and relay valve 134), which are connected together by a number of conduits 120, 122, 128, 132.

Figure 2:
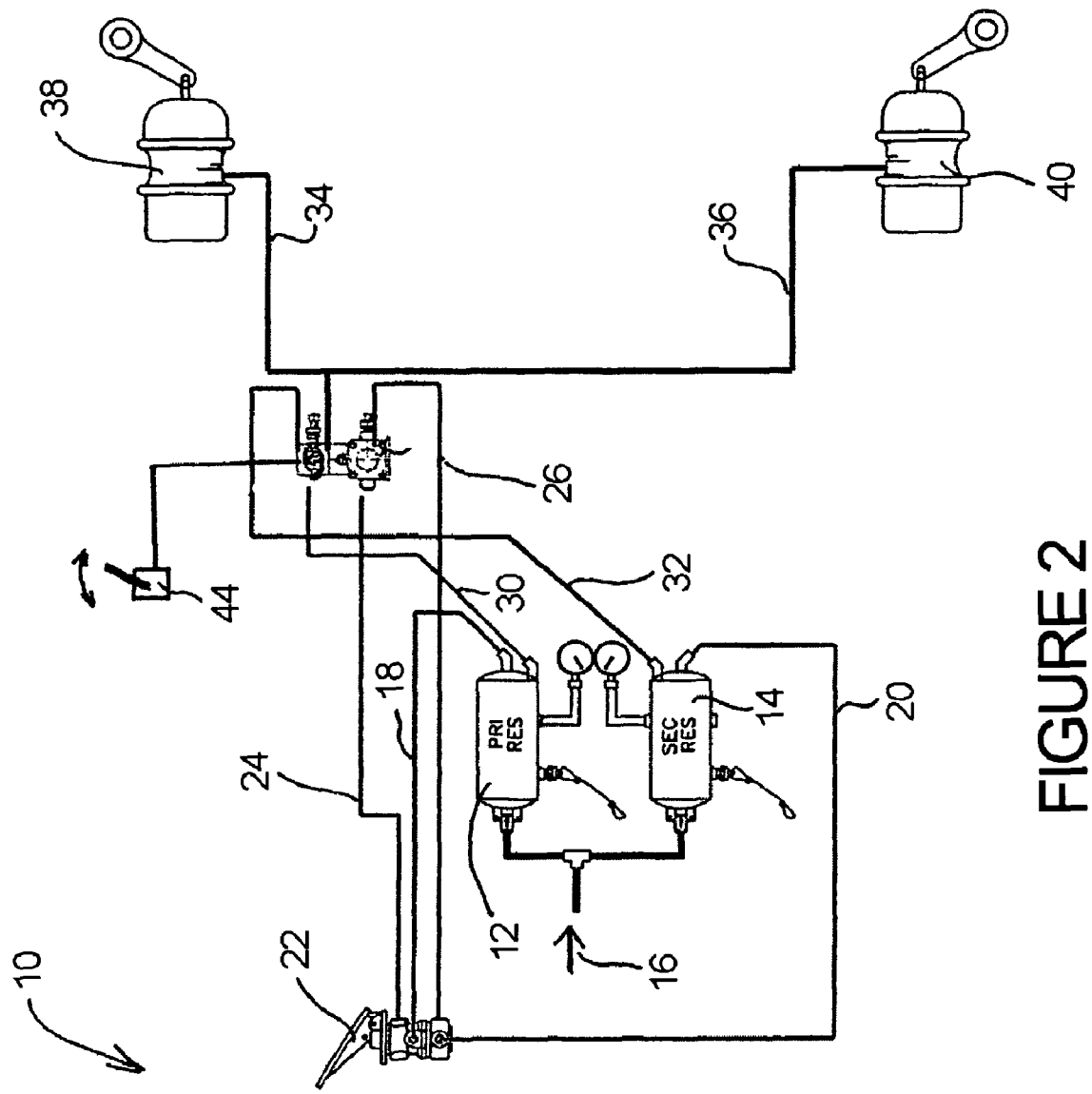
FIG. 2 is a schematic view of a pneumatic brake system for heavy vehicles in accordance with an embodiment of the present invention.

Referring now to FIG. 2, a pneumatic brake system 10 for heavy vehicles in accordance with an embodiment of the present invention is shown. The system 10 includes a primary pressurized air supply reservoir 12 and a secondary pressurized air supply reservoir 14, both of which receive pressurized air from a pressurized air source (indicated by arrow 16), which typically takes the form of a compressor. Primary and secondary pressurized air supply reservoirs 12, 14 are connected via conduits 18, 20 to a brake pedal 22 which is disposed within the cab of the vehicle, typically within easy reach of the foot of the vehicle's driver.

Brake pedal 22 is connected via conduits 24, 26 to one or more inlets of a combination valve 28, which also has one or more inlets which are directly connected to primary pressurized air supply reservoir 14 and secondary pressurized air supply reservoir 16 via conduits 30, 32. Combination valve 28 also includes one or more outlets which are connected via conduits 34, 36 to two brake actuators 38, 40, which are typical dual chamber actuators which include a service brake chamber and a parking (or emergency) brake chamber.

Figure 3:
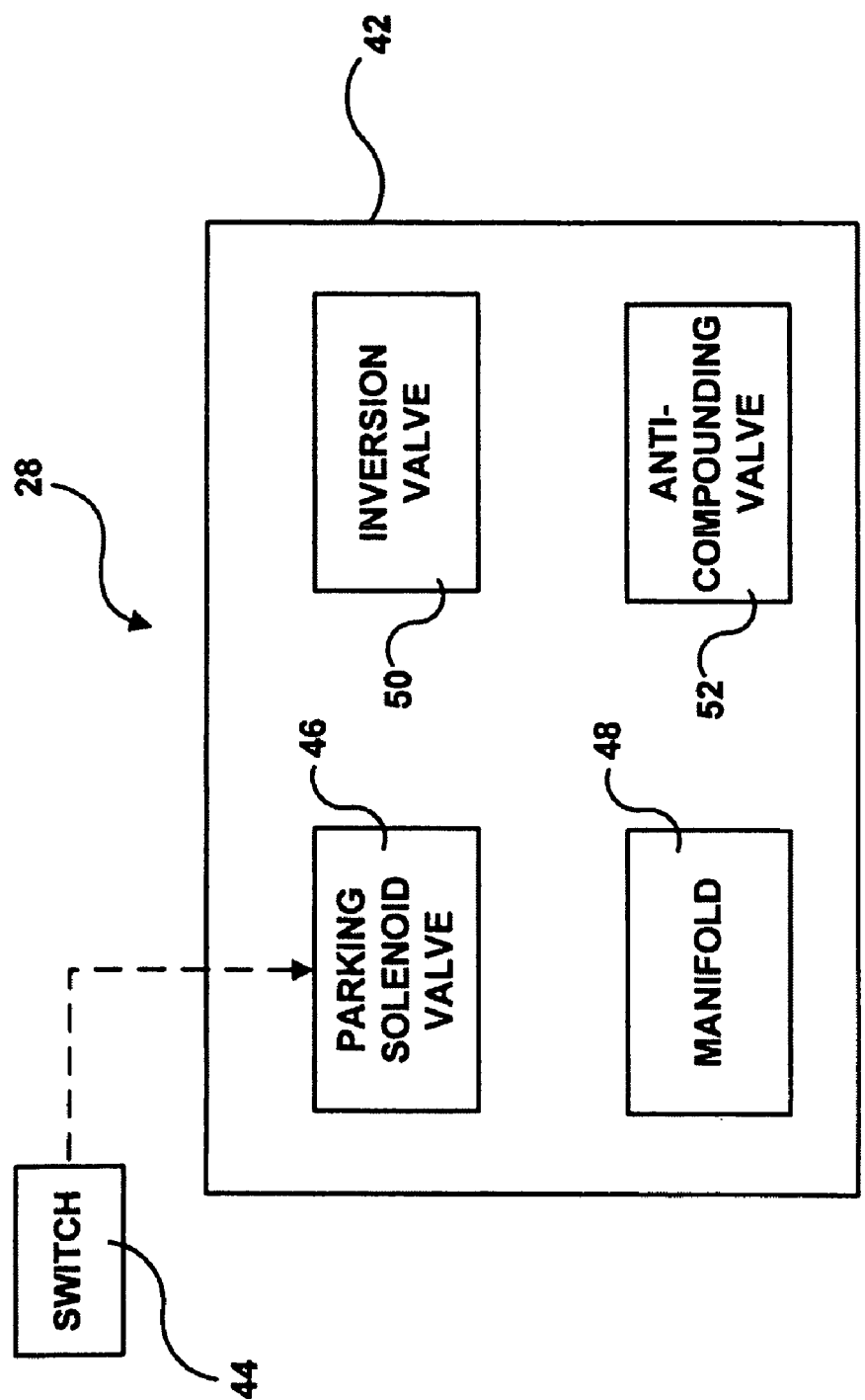
FIG. 3 is a schematic view of a combination valve for use with the pneumatic brake system for heavy vehicles of FIG. 2.

Referring now to FIG. 3, combination valve 28 comprises, within a single housing 42, an electronic parking solenoid valve 46 which is responsive to electrical signals received from a switch 44 (typically located on the dash of the vehicle within easy reach of the driver) to move from one position in which the parking brake chambers of the brake actuators 38, 40 are fluidly coupled to at least one of the primary pressurized air supply reservoir 14 and/or the secondary pressurized air supply reservoir 16 in order to pressurize the parking brake chambers and release the parking brakes, and another position in which the parking brake chambers of the brake actuators are vented in order to exhaust pressure within the parking brake chamber so that the parking brake is applied. Thus, electronic parking solenoid valve 46 and the switch 44 are used to replace the PPDC valve of the known prior art.

The combination valve 28 also includes a manifold 48, an inversion valve 50, an anti-compounding valve 52, and a double check valve 54, each of which performs substantially the same functions as those valves known in the prior art. However, unlike the prior art, because the parking solenoid valve 46 (replacing the PPDC valve), the manifold 48, the inversion valve 50, the anti-compounding valve 52, and the double check valve 54 are all disposed within a single housing 42, a number of conduits (i.e., those corresponding to reference numerals 120, 122, 128, 132 in FIG. 1) can be dispensed with, the valves take up less space and weigh less, the system is easier and cheaper to assemble, etc.

Moreover, the operation of system 10 is substantially identical to the operation of prior art system 100 from the driver's perspective, such that he/she does not have to learn anything new. More specifically, by actuating the brake pedal 22, the driver causes pressurized air to be directed to the service brake chambers of the brake actuators 38, 40 such that the service brakes are applied to slow the vehicle to a stop when the vehicle is moving. By actuating the switch 44, the driver causes pressurized air to be directed to the parking brake chambers of the brake actuators 38, 40 such that the parking brakes (which are usually biased to the applied position) are released and the vehicle is free to move.

It is contemplated that combination valve 28 of the present invention can be readily incorporated into any of numerous other braking systems, both those known and those to be later developed. For example, it is recognized that U.S. Pat. No. 6,322,161, the entirety of which is herby incorporated by reference herein, provides a braking system which incorporates many desirable features.

Briefly, this patent discloses a safety-enhancing automatic air parking brake actuator system that automatically actuators the air brakes in an engaged condition when one or more dangerous conditions exist at various stations around/in the vehicle or equipment. The preferred actuator system operates on the principle that the brake actuator system is electrically connected to the various stations, and, when a circuit including the actuator unit is interrupted, a solenoid valve of the actuator system closes and vents, to cut off the air supply to the air brakes to engage the brakes. The stations may include the vehicle ignition, one or more doors, a wheelchair lift, a dump truck bed, a backhoe arm, or other equipment. By turning off the vehicle ignition switch, which ignition system is preferably the power source for the actuator unit, or by interrupting any of the various circuits to the various stations, the actuator unit will "trip," that is, the solenoid valve will close and vent air, thus, applying the brakes. The actuator system may be installed in an air brake system by placing the brake actuator unit in-line between the air source and the air brakes. The solenoid valve of the brake actuator unit has an exhaust vent which releases air-line pressure when the solenoid valve is de-energized by any one of the various brake actuator circuits being interrupted. In use, if the driver does not manually set the parking brake whenever there is an action about to take place that requires extra caution and care, the invented system sets the air brake for him/her It is contemplated that the benefits of both the present invention and those of U.S. Pat. No. 6,322,161 can be realized by substituting the combination valve 28 of the present invention for the individual solenoid valve disclosed in U.S. Pat. No. 6,322,161.

The present invention, therefore, provides a pneumatic brake system for heavy vehicles which does not require a significant amount of plumbing running in a complex web to connect various system components, which does not require plumbing that is expensive, heavy and relatively difficult to install and which can be installed relatively quickly, which does not suffer from long delays in achieving required system pressures such that parking brake release timing is satisfactory, and which does not employ valves and system components which themselves are expensive, take up a large amount of space, and significantly add to the vehicle's weight.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A vehicle brake system including a parking brake, said brake system comprising:
    a source of fluid pressure adapted to supply a braking force to at least one brake actuator including a parking brake chamber;
    a combination valve fluidly coupling the brake actuator to said source of fluid pressure, said combination valve having an inlet fluidly coupled to the source of fluid pressure and an outlet fluidly coupled to the brake actuator, said combination valve comprising within a single housing:
    a solenoid responsive to electrical signals to move from one position in which the parking brake chamber of the brake actuator is fluidly coupled to said source of fluid pressure in order to pressurize the parking brake chamber and release the parking brake, and another position in which the parking brake chamber of the brake actuator is vented in order to exhaust pressure within the parking brake chamber so that the parking brake is applied; and
    at least one of a manifold, an inversion valve, a double check valve and an anti-compounding valve;
    wherein said combination valve comprises within a single housing said solenoid and all four of the manifold, the inversion valve, the double check valve and the anti-compounding valve.

2. The vehicle brake system of claim 1 further comprising a switch which generates the electrical signals to which said solenoid is responsive.

3. The vehicle brake system of claim 2 wherein said switch is located on a dash of the vehicle.

4. The vehicle brake system of claim 1 wherein said source of fluid pressure comprises a primary supply reservoir and a secondary reservoir, both of which are fluidly coupled to said combination valve.

5. The vehicle brake system of claim 1 wherein said brake actuator further includes a service brake chamber, and further comprising a brake pedal operable by a driver of the vehicle in order to supply pressure to the service brake chamber.

6. The vehicle brake system of claim 5 wherein said brake pedal is fluidly coupled between said source of fluid pressure and said combination valve.

7. The vehicle brake system of claim 6 wherein said source of fluid pressure comprises a primary supply reservoir and a secondary reservoir, both of which are fluidly coupled to said brake pedal.

8. The vehicle brake system of claim 7 wherein said primary supply reservoir and said secondary supply reservoir are further fluidly coupled directly to said combination valve.

9. The vehicle brake system of claim 1 wherein the at least one brake actuator comprises a plurality of brake actuators.

10. A combination valve adapted for use in a vehicle brake system including a parking brake, said combination valve having an inlet adapted to be fluidly coupled to a source of fluid pressure and an outlet adapted to be fluidly coupled to a brake actuator having a parking brake chamber, said combination valve comprising within a single housing:
    a solenoid responsive to electrical signals to move from one position in which the outlet is fluidly coupled to the inlet, and another position in which the outlet is vented; and
    at least one of a manifold, an inversion valve, a double check valve and an anti-compounding valve;
    wherein said combination valve comprises within a single housing said solenoid and all four of the manifold, the inversion valve, the double check valve and the anti-compounding valve.

11. The combination valve of claim 10 wherein the electrical signals to which said solenoid is responsive are generated by a switch.

12. The combination valve of claim 11 wherein said switch is located on a dash of the vehicle.

13. A vehicle brake system including a parking brake, said brake system comprising:
    a primary fluid pressure supply reservoir and a secondary fluid pressure supply reservoir adapted to supply a braking force to at least one brake actuator including a parking brake chamber and a service brake chamber;
    a brake pedal fluidly coupled to said primary fluid pressure supply reservoir and said secondary fluid pressure supply reservoir, said brake pedal operable by a driver of the vehicle in order to supply pressure to the service brake chamber;
    a combination valve fluidly coupled between said brake pedal and the brake actuator, said combination valve also being fluidly coupled directly to said primary fluid pressure supply reservoir and said secondary fluid pressure supply reservoir, said combination valve comprising within a single housing:
    a solenoid responsive to electrical signals received from a switch located on a dash of the vehicle to move from one position in which the parking brake chamber of the brake actuator is fluidly coupled to said source of fluid pressure in order to pressurize the parking brake chamber and release the parking brake, and another position in which the parking brake chamber of the brake actuator is vented in order to exhaust pressure within the parking brake chamber so that the parking brake is applied;

a manifold;

an inversion valve;

a double check valve; and an anti-compounding valve.

14. The vehicle brake system of claim 13 wherein the at least one brake actuator comprises a plurality of brake actuators.

* * * * *